Jan. 17, 1933.　　　　M. P. HUBBELL　　　　1,894,515

CHUCK

Filed Aug. 25, 1931

WITNESS
G. V. Rasmusen

INVENTOR
MINOTT P. HUBBELL
ATTORNEYS

Patented Jan. 17, 1933

1,894,515

UNITED STATES PATENT OFFICE

MINOTT P. HUBBELL, OF ASHBURNHAM, MASSACHUSETTS

CHUCK

Application filed August 25, 1931. Serial No. 559,192.

The invention relates to chucks, particularly those of a type known under the trade name "Almond chucks" and has for its object to increase the work-piece gripping capability of the jaws thereof with resultant increase in work-piece driving power of the chuck while preserving the quality of ready releasability of the jaws and avoiding undue jamming of the parts.

Figure 1:
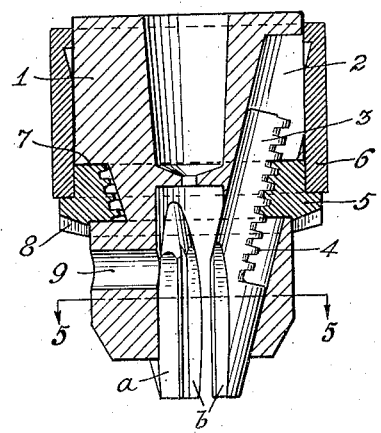
Figure 3:
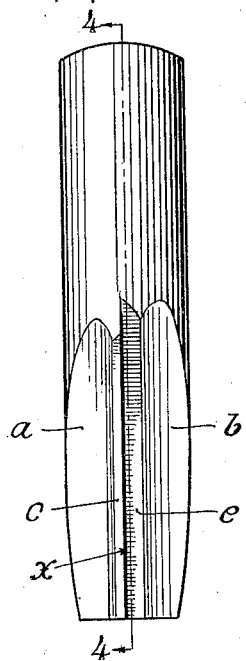
Figure 4:
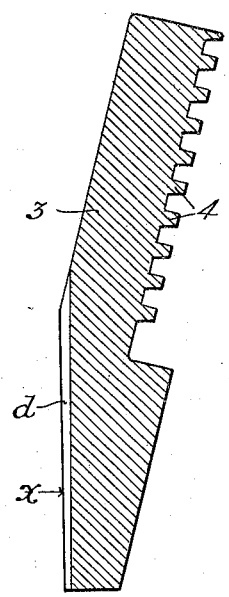
Figure 2:
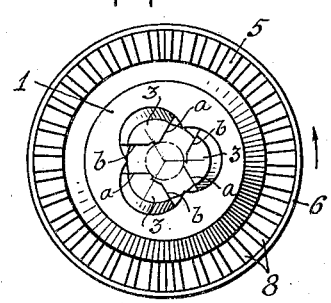
Figure 6:
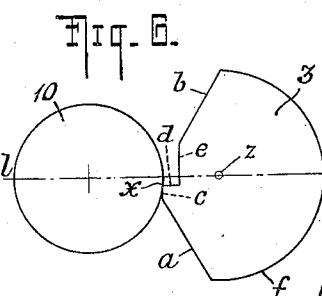
Figure 5:
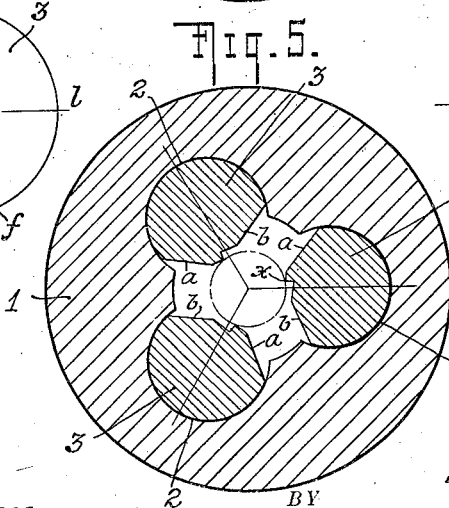
Figure 7:
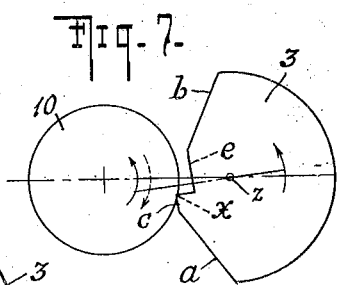

The invention is illustrated in the accompanying drawing in which Fig. 1 is a vertical section through the chuck, Fig. 2 is an inverted view of the chuck, Fig. 3 is an enlarged face view of one of the jaws, Fig. 4 is a vertical section on line 4—4 of Fig. 3; Fig. 5 is an enlarged horizontal section taken on line 5—5 of Fig. 1; Fig. 6 is a diagrammatic illustration of the relative position between one of the jaws and the shank of a tool at the moment when the jaws begin to close on the shank. Fig. 7 is a diagrammatic illustration similar to Fig. 6 showing the final position of the jaw and the tool shank. In the drawing, 1 represents the massive chuck body, 2 the angularly inclined jaw recesses, 3 the jaws which are movable in said jaw recesses 2 pursuant to a nut control functioning between the threads 4 of the jaws, the threaded ring 5, and the ferrule 6, the ferrule being tightly associated with the ring 5. The ring 5 is seated in a nut recess 7 and is a broken ring. The ring 5 is provided with gear teeth 8 adapted for cooperation with the teeth of a key when the end of such key is inserted in the socket 9. As the ring 5 is turned either manually through the ferrule 6 or by means of the key, a rotation in one direction will cause the jaws 3 to advance uniformly toward each other, while movement in the other direction causes the jaws to retract uniformly from each other. The work-piece engaging edge portions of the jaws are substantially parallel to each other and maintain said parallelism in all positions of the jaws.

The parts of the chuck thus far described are standard and known, as are also many variations, all operating upon the same general principles. In some chucks of this general type, the movement of the jaws is controlled through threads located on the inner portions of the jaws instead of on the outer portions of the jaws as in my Patent No. 1,668,317. In other chucks of this type, ball bearings are used to effect increased tightening and therefore work-piece driving power. Common to all such chucks, however, is the massive body with actually inclined jaw recesses, jaws movable in the jaw recesses and a nut control for the jaws and the maintenance of the parallel relation between the respective parts of the work-piece-engaging edge portions of the jaws.

In the preferred embodiment of the invention three jaws are used and the faces $a$ and $b$ thereof are preferably at an angle of 120° to each other, so that when the jaws are in the most advanced position and no work-piece holds them apart, the face $a$ of one jaw will come into mating contact with the face $b$ of the adjacent jaw. Preferably also the faces $a$ and $b$ lie in planes which do not pass through the longitudinal axis of the chuck 1, but as clearly shown in Figs. 2 and 5, lie in planes which pass to one side of the longitudinal axis of the chuck, said arrangement permitting the jaws to grip tool shanks of smaller diameters than would be possible if said planes were radial with respect to the axes of the chuck.

In the manufacture of the jaws (which are made of hardened steel) exact accuracy and uniformity of shape at the work-piece-engaging portions of the jaws is difficult to attain directly. It has accordingly become the practice in the manufacture of chucks of this type to bring the jaws to their most retracted position, farthest apart, and then to introduce a rotating truing instrumentality which will grind off a small portion of those parts of the jaws which are nearest to the axis of the chuck. The result of this procedure is that the tool-engaging portion of the ordinary chuck is really an arc which, when closing upon the work-piece, comes into tangential contact with the periphery of the tool shank. A similar condition exists at $c$ in the jaws shown in the drawing. Instead of, however, having the portion $c$ occupy a position at the center of the working face of the jaws in radial relation to the axis of the chuck, I place the part $c$ to one side of said radial line and form the corner or angle $x$ by providing the face $d$ which lies in a plane approximately parallel to the said radial line. The face $e$ then connects the faces $d$ and $b$. The result of this configuration of the jaw is illustrated in Fig. 6. As the jaw 3 closes upon the shank of a tool, for example, indicated at 10, contact will first be established between the periphery of the work-piece and the face $c$ which, being in the form of a segment of a larger arc than that which is represented by the contacting part of the shank 10, will first come into tangential contact with the periphery of said shank. As more force is applied to the nut control to tighten the jaws on the shank 10, the off side position of the face $c$ with reference to the line $l$—$l$ and the point $z$ which represents the axis of the jaw, causes the jaw to be given a slight partial rotative movement on its axis $z$ until the position shown in Fig. 7 is arrived at. This rocking action of the jaw is permitted because of the slight play that exists between the threads of the ring 5 and the threads 4 of the jaws 3. The partial rotative movement of the jaws will be in the direction of the rotation of the chuck when in use and in a direction which tends to slacken the frictional contact between the threads in the nut control in the jaws. As the nut control is further actuated, the relative position of the jaw 3 and the tool shank 10 will remain the same as that shown in Fig. 7, but the parts will be brought into tighter frictional contact and the contact, due to the peculiar construction of the new jaws, will be practically a line contact between the line represented by the corner $x$ and the periphery of the tool shank 10.

The direction of motion of the chuck when in use is shown by the full line arrows in the jaw 3 and tool 10 of Fig. 7, while the dotted line arrow in the tool shank 10 indicates the direction of the resistance against the gripping action of the jaws. It will readily be seen that by the new arrangement the maximum retentive force and resistance against slip as between 3 and 10 is provided for and that if, for example, the face $c$ were centered with reference to the line $l$—$l$ of Fig. 6 or was situated on the other half of the jaw, changing places with $e$, the contact between the work-piece-engaging portions of the jaws and the tool shank 10 would remain tangential and therefore allow slippage between the shank 10 and the jaw 3 to occur very much sooner.

Comparison of the new chuck with chucks of existing types shows the following results. The comparative tests were of one-half inch chucks, one of the new type, a standard chuck, and a ball-bearing chuck. The limit of the testing apparatus was 100 foot pounds. When the standard chuck was hand-tightened on a soft bar, slippage between the bar and the jaws occurred at between 2½ to 3 foot pounds and the same figures resulted when the ball-bearing chuck was used. In the case of the new chuck, however, the testing apparatus went to its limit of 100 foot pounds on a hand-tightened chuck against a soft bar. Key-tightening, therefore, so far as soft bars are concerned, was not necessary in the case of the new chuck, but if used would show 100 foot pounds, the limit of the testing apparatus the same as when hand tightened. Key-tightening for the standard chuck led to a reading of the testing apparatus indicative of slippage at 15 foot pounds, while in the ball-bearing chuck key-tightening increased the effectiveness to between 40 and 45 foot pounds. On soft bars, accordingly, the grip of the new chuck was found to be 100% perfect. When the same tests were made on hard bars, hand-tightening resulted in slippage of the standard jaw at between 1 and 1½ foot pounds, with the ball-bearing chuck at between 1½ to 2 foot pounds, and with the new chuck at 5 foot pounds. Key-tightening resulted in raising the figures for the standard jaw to about 12½ foot pounds, the ball-bearing chuck to 30 to 35 foot pounds, and the new chuck to 33 to 38 foot pounds. In every instance the new chuck proved itself vastly superior to the best performance of any previously known chucks of the same general type.

Inasmuch as the chuck revolves in the direction of the arrow shown in connection with Figs. 2 and 5, the chuck face $b$ is the advancing face, while $a$ is the trailing face. The face $c$ is accordingly located on that face of the jaw which is delimited by the trailing face of the jaw.

Various modifications may, of course, be resorted to without departing from the spirit of my invention. Thus, the face $d$ may lie nearer to and even be coincident with the line $l$—$l$ of Fig. 6. The face $c$ may be entirely dispensed with and the face $a$ be made to run from the line $x$ to the circular periphery $f$ of the jaw. The faces $a$ and $b$ may be placed in planes radial to the axis of the chuck. The rocking action of the jaws may be dispensed with, provided the initial setting of the jaws by the nut control therefor will maintain a position of the line $x$ with respect to the tool shank 10 generally indicated in Fig. 7. For best results, however, I have found that the particular jaw contour and arrangement of parts illustrated in the drawing is most satisfactory.

One feature of the new chuck which is also of advantage is that when it comes to loosening the tool from the grip of the jaws the tendency of the jaw of Fig. 7 to rock back into the position of Fig. 6, assists in obtaining the unloosening effect, so that in many instances a chuck which required key-tightening to hold the tool in the chuck adequately, can be unloosened by manual operation of the ferrule 6.

Then again, the invention makes it possible to obtain the entire advantages thereof in connection with all existing chucks of the same type by the mere replacement in the existing chucks of the old types of jaws by the new types of jaws, a very inexpensive procedure. While it is preferred that all the jaws should have the same contour, satisfactory results can be obtained by using in connection with jaws of the standard type, one or more of the jaws of the new type.

I claim:

1. A chuck having a body with axially inclined circular jaw recesses, jaws circular in plan projection having work-piece-engaging edge portions, said jaws being movable longitudinally in the jaw recesses for advancement and retraction and a nut control for said jaws the work-piece-engaging edge portion of at least one of the jaws being, in cross-section, a segment of an arc terminating on the side facing the advancing face of the jaw in a sharp corner representative of a line parallel to the longitudinal axis of the chuck, said jaw being slightly rotatable about its axis whereby said arc is adapted first to come into tangential contact with the periphery of the work-piece and then upon intensification of said contact by further actuation of the nut control and rotation of said jaw on its own axis, to move out of such tangential position and into a position where a line contact is made with the work-piece.

2. In a chuck of the type described, a jaw configured to have a sectional contour comprising a circular part $f$, an advancing face $b$, a trailing face $a$, said faces being approximately at 120° to each other, a face $d$ approximately radial to the axis of the jaw and located no closer to the advancing face of the jaw than the radial line between the axis of the chuck and the axis of the jaw, and a face $e$ set back in the jaw with reference to the work-piece to be engaged by said jaw, the trailing face of the jaw connecting with the radially disposed face $d$ at a sharp angle.

3. In a chuck of the type described, a jaw configured to have a sectional contour comprising a circular part $f$, an advancing face $b$, a trailing face $a$, said faces being approximately at 120° to each other, a face $d$ approximately radial to the axis of the jaw and located on the trailing side of the line between the axis of the chuck and the axis of the jaw, a face $e$ set back in the jaw with reference to the work-piece to be engaged by said jaw and connecting the faces $d$ and $b$, and an arc-shaped face $c$ connecting the faces $a$ and $d$ and meeting the radially disposed face $d$ at a sharp angle.

4. A chuck such as set forth in claim 1, in which all of the jaws have the same configuration.

5. A chuck having a body with axially inclined circular jaw recesses, jaws circular in plan projection having work-piece-engaging edge portions, said jaws being movable longitudinally in the jaw recesses for advancement and retraction and having each a minor capacity for limited rotative movement on its own axis and a nut control for said jaws, the work-piece-engaging edge portion of at least one of said jaws presenting at the advancing face of the jaw, a sharp corner representative of a line parallel to the longitudinal axis of the chuck, said corner being so positioned with relation to the longitudinal central lines of the jaw and of the chuck respectively, that after contact of the jaw with the work piece is established and intensification of its contact with the work piece is then effected by further actuation of the nut control, said jaw will be compelled to rock on its longitudinal axis into a position where an intensified line contact is made between said corner of said jaw and said work piece, said line thereafter lying laterally of a plane passing through the longitudinal axial lines of the chuck and of the jaw respectively and on the trailing side of the jaw with reference to said plane.

6. A chuck such as described in claim 5 in which the chuck body, the jaw recesses, the jaws, and the nut control of the jaws are all so associated that each of the several jaws in closing on the work piece will be given a slight partial rotation on their own axes in the direction of the rotation of the chuck when in use.

7. A chuck such as described in claim 5 in which the chuck body, the jaw recesses, the jaws, and the nut control of the jaws are all so associated that each of the several jaws in closing on the work piece will be given a slight partial rotation on their own axes in the direction of the rotation of the chuck when in use and in a direction slackening the frictional contacts in the nut control of the jaws.

8. A chuck such as described in claim 5 in which the jaws have lateral meeting faces, no one plane of which in the completely closed position of the jaws when their respective meeting faces are in contact with each other in a coincident plane passes through the longitudinal axis of the chuck, whereby the capacity of the chuck to hold smaller work pieces is increased.

9. A chuck such as described in claim 5 in which the chuck body, the jaw recesses, the jaws, and the nut control of the jaws are all so associated that each of the several jaws in closing on the work piece will be given a slight partial rotation in the direction of the rotation of the chuck when in use and in which the several jaws in the completely closed position thereof contact with each other along coincident planes, none of which passes through the axial center of the chuck.

In testimony whereof I have hereunto set my hand.

MINOTT P. HUBBELL.